US012433756B2

(12) United States Patent
Ahmadi

(10) Patent No.: US 12,433,756 B2
(45) Date of Patent: Oct. 7, 2025

(54) IMPLANTS, ASSEMBLIES AND METHODS OF MANUFACTURING SUCH IMPLANTS OR ASSEMBLIES

(71) Applicant: AM Solutions Holding B.V., Delft (NL)

(72) Inventor: Seyed Mohammad Ahmadi, The Hague (NL)

(73) Assignee: AM Solutions Holding B.V., The Hague (NL)

( * ) Notice: Subject to any disclaimer, the term of this patent is extended or adjusted under 35 U.S.C. 154(b) by 1135 days.

(21) Appl. No.: 17/284,770

(22) PCT Filed: Oct. 15, 2019

(86) PCT No.: PCT/NL2019/050679
§ 371 (c)(1),
(2) Date: Apr. 12, 2021

(87) PCT Pub. No.: WO2020/085897
PCT Pub. Date: Apr. 30, 2020

(65) Prior Publication Data
US 2022/0142783 A1 May 12, 2022

(30) Foreign Application Priority Data
Oct. 25, 2018 (NL) ..................................... 2021874

(51) Int. Cl.
*A61F 2/44* (2006.01)
*A61F 2/30* (2006.01)
(Continued)

(52) U.S. Cl.
CPC ............ *A61F 2/44* (2013.01); *A61F 2/30771* (2013.01); *A61F 2/3094* (2013.01); *A61F 2/389* (2013.01);
(Continued)

(58) Field of Classification Search
None
See application file for complete search history.

(56) References Cited

U.S. PATENT DOCUMENTS 6,127,597 A   10/2000  Beyar et al.
8,535,380 B2   9/2013  Greenhalgh et al.
(Continued)

FOREIGN PATENT DOCUMENTS

DE   10 2015 110 202 B3   6/2016
EP      3 092 976 A1    11/2016
(Continued)

OTHER PUBLICATIONS

PCT/NL2019/050679, Mar. 26, 2020, International Search Report and Written Opinion.
(Continued)

*Primary Examiner* — Javier G Blanco
(74) *Attorney, Agent, or Firm* — Wolf, Greenfield & Sacks, P.C.

(57) ABSTRACT

An implant for in-vivo implantation which comprises an assembly of two or more constructive elements (3,4) which are movable relative to each other. Each constructive element (3,4) is partly or completely porous and comprises a porous part (5,6) with a matrix (7,8) of open cells (51,61). A first matrix (7) of the first element (3) comprises a first overlapping part (50) with a form-closed connection to a second overlapping part (60) of a second matrix (8) of the second of the constructive elements (4) through which the first overlapping part extends. The overlapping parts (50,60) are movable relative to each other to change a combined shape of the overlapping parts.

16 Claims, 11 Drawing Sheets

(51) Int. Cl.
    *A61F 2/38*     (2006.01)
    *A61F 2/90*     (2013.01)
    *B22F 10/28*     (2021.01)

(52) U.S. Cl.
    CPC ...... *A61F 2/90* (2013.01); *A61F 2002/30537* (2013.01); *A61F 2002/3092* (2013.01); *A61F 2002/30934* (2013.01); *A61F 2240/001* (2013.01); *B22F 10/28* (2021.01)

(56) References Cited

U.S. PATENT DOCUMENTS

| | | | |
|---|---|---|---|
| 10,238,443 | B2 | 3/2019 | Seifert et al. |
| 2003/0004575 | A1 | 1/2003 | Erickson |
| 2005/0278036 | A1 | 12/2005 | Leonard et al. |
| 2006/0212118 | A1 | 9/2006 | Abernathie |
| 2006/0287725 | A1* | 12/2006 | Miller ............... A61F 2/4455 623/17.11 |
| 2007/0173826 | A1 | 7/2007 | Canaveral et al. |
| 2009/0024217 | A1 | 1/2009 | Levy et al. |
| 2009/0292361 | A1 | 11/2009 | Lopez |
| 2010/0292796 | A1 | 11/2010 | Greenhalgh et al. |
| 2012/0010668 | A1 | 1/2012 | Shimko |
| 2013/0197647 | A1 | 8/2013 | Wolters et al. |
| 2014/0236297 | A1 | 8/2014 | Iott et al. |
| 2014/0277501 | A1 | 9/2014 | Northcutt et al. |
| 2016/0317188 | A1 | 11/2016 | Oglaza et al. |
| 2017/0354513 | A1 | 12/2017 | Maglaras et al. |
| 2018/0078384 | A1 | 3/2018 | Suddaby |
| 2018/0296361 | A1 | 10/2018 | Butler et al. |
| 2019/0053912 | A1 | 2/2019 | Suddaby |
| 2019/0083275 | A1 | 3/2019 | Bell et al. |
| 2019/0274838 | A1 | 9/2019 | Manwill et al. |
| 2020/0093603 | A1 | 3/2020 | Manwill et al. |
| 2022/0168113 | A1 | 6/2022 | Ahmadi et al. |
| 2023/0301695 | A1 | 9/2023 | Ahmadi et al. |

FOREIGN PATENT DOCUMENTS

| | | |
|---|---|---|
| EP | 3 463 202 A1 | 4/2019 |
| JP | 2003-530915 A | 10/2003 |
| JP | 2004-522469 A | 7/2004 |
| JP | 2008-520269 A | 6/2008 |
| JP | 2011-520580 A | 7/2011 |
| JP | 2012-509157 A | 4/2012 |
| JP | 2018-526152 A | 9/2018 |
| WO | WO 01/54598 A1 | 8/2001 |
| WO | WO 01/78798 A1 | 10/2001 |
| WO | WO 02/38062 A2 | 5/2002 |
| WO | WO 2006/051547 A2 | 5/2006 |
| WO | WO 2009/147527 A2 | 12/2009 |
| WO | WO 2010/059866 A1 | 5/2010 |
| WO | WO 2016/112175 A1 | 7/2016 |
| WO | WO 2017/042366 A1 | 3/2017 |
| WO | WO 2017/192525 A1 | 11/2017 |
| WO | WO 2017/201371 A1 | 11/2017 |
| WO | WO 2018/163056 A1 | 9/2018 |

OTHER PUBLICATIONS

PCT/NL2019/050679, May 6, 2021, International Preliminary Report on Patentability.

Office Action for Japanese Application No. 2021-560279, mailed Sep. 1, 2023.

International Search Report and Written Opinion for International Application No. PCT/NL2019/050679, mailed Mar. 26, 2020.

International Preliminary Report on Patentability for International Application No. PCT/NL2019/050679, mailed May 6, 2021.

Patrick et al., Robust sacrificial polymer templates for 3D interconnected microvasculature in fiber-reinforced composites. Composites Part A: Applied Science and Manufacturing. Sep. 1, 2017;100:361-70.

Sun et al., Bio-CAD modeling and its applications in computer-aided tissue engineering. Computer-aided design. Sep. 15, 2005;37(11):1097-114.

Wang et al., Interlocking assembled 3D auxetic cellular structures. Materials & Design. Jun. 5, 2016;99:467-76.

Office Action for Canadian Application No. 3,133,426, dated Jun. 2, 2023.

\* cited by examiner

IMPLANTS, ASSEMBLIES AND METHODS OF MANUFACTURING SUCH IMPLANTS OR ASSEMBLIES

CROSS REFERENCE TO RELATED APPLICATIONS

This Application is a national stage filing under 35 U.S.C. 371 of International Patent Application Serial No. PCT/NL2019/050679, filed Oct. 15, 2019. Foreign priority benefits are claimed under 35 U.S.C. § 119(a)-(d) or 35 U.S.C. § 365(b) of Dutch application number 2021874, filed Oct. 25, 2018. The entire contents of these applications are incorporated herein by reference in their entirety.

FIELD OF THE INVENTION

This invention relates to implants, assemblies and methods of manufacturing such implants or assemblies.

BACKGROUND OF THE INVENTION

Various implants for in-vivo implantation, e.g. in humans or non-human animals, such as domesticated animals are known, such as dental implants, spine cages, hip prosthesis. Depending on the type of surgery and application, such implants may need to be adjustable in shape, e.g. to expand after insertion through a relatively small incision in the patient's body, to adapt to the shape of the bone of the subject during surgery or to adjust the implant during recovery such as to adjust for bone regrowth. Various types of implants with an adjustable shape are known.

As a first example, expandable bone-substituting implants such as expandable spinal fusion implants are known in the art. For instance, International patent application publication number WO2018002720 discloses expandable, angularly adjustable, intervertebral cages. These cages comprise upper and lower plate components connected by articulating expansion or adjustment mechanisms that allow the cage to change size and angle as needed. The expandability of such implants allows placement of a potentially larger implant through a smaller opening in a patient's body, with selective expansion in a selected direction(s) providing the advantage of increasing the height of the implant.

As a second example, implants which replace skeletal structures are known. It is sometimes necessary to remove one bone such as a vertebrae, or a portion of the bone, in response to various pathologies such as tumor growth, or trauma. Expandable implants may also be useful in replacing long bones or portions of appendages such as the legs and arms, or a rib or other bone that is generally longer than it is wide. Examples include femur, tibia, fibula, humerus, radius, ulna, phalanges, clavicle, and any of the ribs. Here, expandable implants may assist with restoring proper loading to the anatomy and achieving more secure fixation of the implant. For example, from European patent application publication EP 3181273, a mesh is known which can be shaped to fit into a non-uniform space and provide a scaffold for cell regeneration.

As another example, expandable stents are known, such as self-expandable and balloon expandable stents. Balloon expandable stents and self-expanding stents are generally delivered in a cylindrical form, compressed to a smaller diameter and are placed within a vessel of the subject to be treated using a catheter-based delivery system. When positioned at a desired site within a vessel of the living body, these devices are expanded by a balloon, or allowed to "self-expand," to the desired diameter. They typically consist of cross-hatched, braided or interconnecting rows of metal that are assembled into a tube-like structure.

However, as will be apparent from the above overview, a general disadvantage is that for each type of implant and application a very specific solution is required to obtain the expandability or adaptability of the shape of the implant.

SUMMARY OF THE INVENTION

The present invention provides an implant, assembly and method of manufacturing such implants or assemblies as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the FIGS. are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated for the understanding and appreciation of the underlying concepts of the present invention and in order not to obfuscate or distract from the teachings of the present invention.

Figure 1:
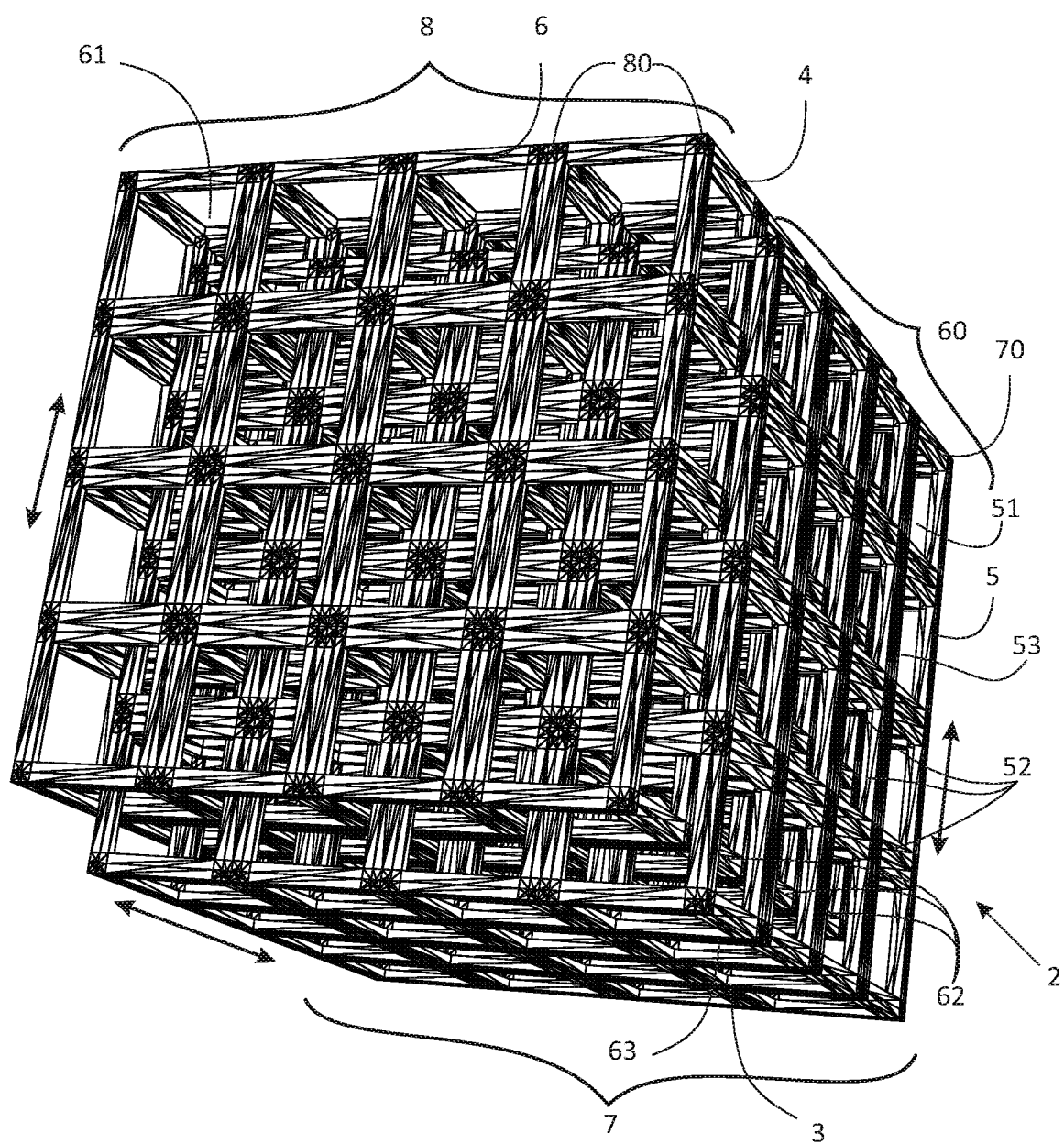
FIG. 1 schematically shows a perspective view of an example of an embodiment of a constructive assembly.

Referring to FIG. 1, an example of an assembly 2 is shown therein. The assembly 2 can e.g. be used in an implant 1 for in-vivo implantation, such those illustrated in FIG. 9-12 or another implant. The assembly 2 comprises two, or more than two, constructive elements 3,4 which are movable relative to each other, as indicated in FIG. 1 with the arrows. Each constructive element 3,4 is partially or completely porous and comprises (in this example consists of) a porous part 5,6 with a matrix 7,8 of open cells 51,61. For sake of simplicity only the matrices are shown in FIG. 1, but it will be apparent that the elements 3,4 may comprises other parts as e.g. shown in FIGS. 2 and 3, for instance.

In the shown example, in each of the matrices 7,8 the rows have the same length, as do the columns, and the matrices thus have a cuboid-shape. The open cells 51,61 are likewise cuboid, and more specifically cubic, in this example. However, the open cells 51,61 may have a different shape, as is explained below in more detail. The rows and columns may differ in length such that the matrices 7,8 have one or more non-planar sides and/or some sides are not perpendicular or parallel to others, such as a parallelepiped shape.

A first matrix 7 of the first of the constructive elements 3 comprises a first overlapping part 50 with a form-closed connection to at least a second overlapping part 60 of the second matrix 6 of the second of the constructive elements 4 through which the first overlapping part 50 extends. In this respect, the term "form-closed" refers to the German term "Formschluss", which is a connection between at least two connected elements formed by the interlocking shapes of the elements and in which the absence of a connecting force does not release the connection. In other words, in the case of a form-closed connection, the shapes of the connected elements are in the way of the other, such that the connection cannot be released without deforming the shapes.

As indicated with the arrows in FIG. 1, the overlapping parts 50,60 are movable relative to each other to change a combined shape of the overlapping parts 50,60. For example, the combined shape can be expanded by moving the overlapping parts translationally away relative to each other, be shrunk by moving them translationally towards each other or be more or less tapered by rotating the overlapping parts.

Thus, the shape can be varied in various manners and accordingly the assembly easily adapted for use in a large variety of applications, instead of having to conceive a specific solution to change a shape in a specific application. Although in the following an assembly of a biocompatible material for application in-vivo implants is explained as an example, the structure of the assembly is suitable for other applications, such as construction materials. For example, the assembly may be scaled and dimensioned for other applications and e.g. be several cubic decimeters or more. In such a case, the assembly may be made of non-biocompatible materials, like weathering steel or other steel alloys for example.

In this example, the change in the combined shape of the overlapping parts 50,60 also changes the combined shape of the matrices 7,8. The first matrix 7 further comprises a projecting part 70 which may be movable to project to a larger or smaller extent out of the second matrix 8. As in this example, the second matrix may also comprise a projecting part 80 which may be movable to project to a larger or smaller extent out of the first matrix 7. The overlapping parts 50,60 are movable to bring the assembly from a first state to a second state. In the first state the projecting part 70 projects to a lesser extent out of the second matrix than in the second state. In the second state the projecting part may be rotationally and/or translationally moved in a direction away from the second matrix relative to the first state. Thus, e.g. the shape of an implant can be expanded to fill a gap between the implant and a bone, or be adjusted such as to be more or less tapered to align a side of the implant to a surface, just to name a few.

Figure 13:
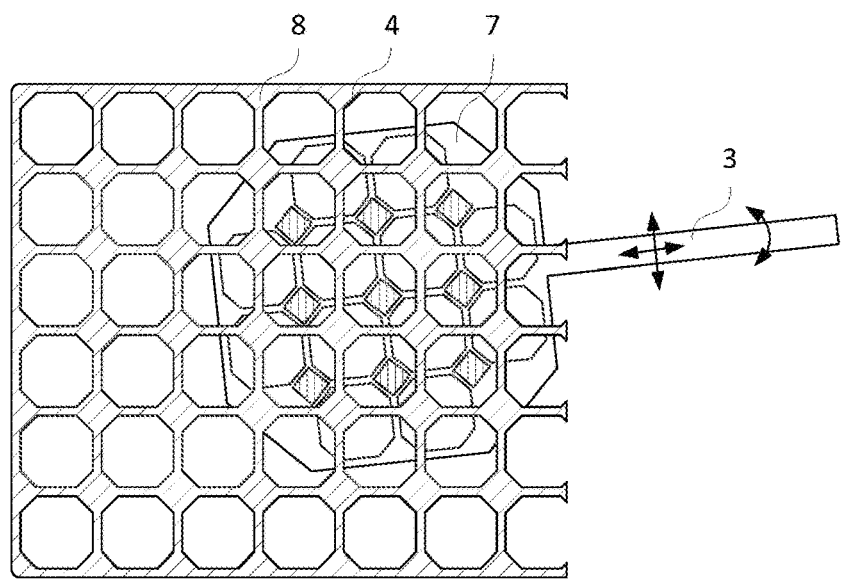
FIG. 13 schematically shows a cross-sectional view of an example of an embodiment of a constructive assembly.
Figure 14:
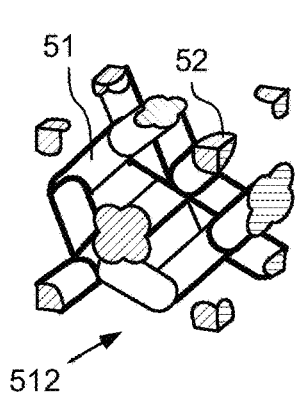
FIGS. 14-18 schematically show perspective view of types of unit cell suitable for a constructive assembly.
Figure 15:
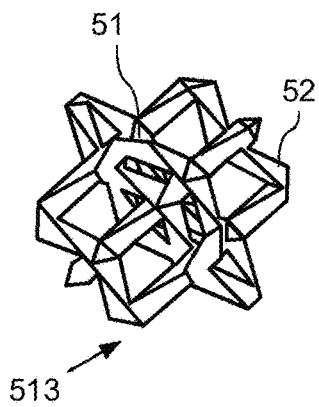
Figure 16:
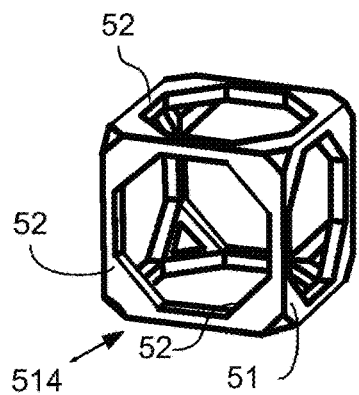
Figure 17:
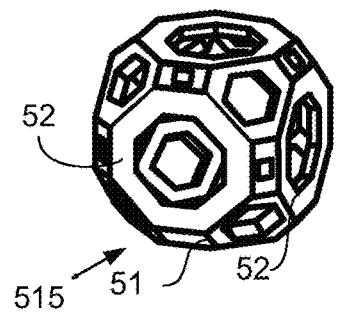
Figure 18:
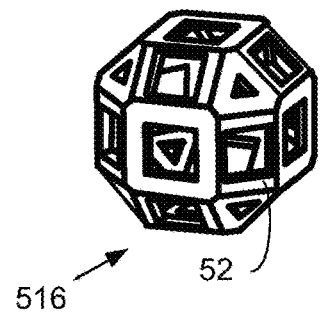

Alternatively, one of the matrices 7,8 may be incorporated inside the other matrix, as illustrated in FIG. 13. In such a case, due to the movable form-closed connection, the matrices can move relative to each other and e.g. the incorporated matrix 7 move parts of the constructive element 3 projecting out of the other matrix 8, as indicated with the arrows. In this example the projecting part is a rod which forms a mechanical link with the matrix 7, but it will be apparent that more complex shapes may be used and that the projecting part may be connected to the matrix by a joint.

As a couple of examples, due to the change in shape, parts attached to the overlapping parts 50, 60 can be moved relative to each other, and e.g. be moved away from and/or moved towards and/or be rotated relative to each other. The assembly can thus be used as a joint or coupling between parts of an implant or other mechanical linkages that have to be movable (i.e. translationally and/or rotationally) relative to each other.

Figure 9:
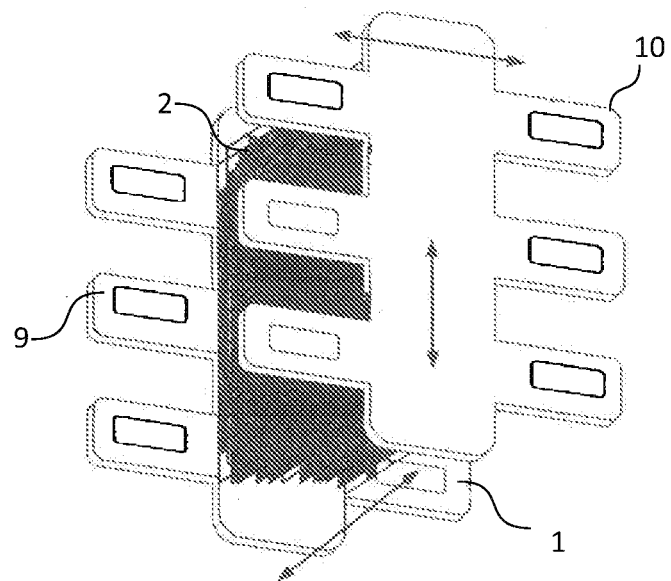
FIG. 9 schematically shows a perspective view of example of an embodiment of an implant in which a constructive assembly is used.

Also, the shape may be changed to expand the size and bridge a gap between two surfaces, e.g. such as in case of a tibia implant placed in a wedge-shaped incision in the tibia from above in the knee proximal region. The implant can then e.g. be inserted into the incision. After the implant is inserted into the tibia incision, the shape of the assembly is changed upwards until the side surfaces of the implant rest against the cut surfaces of the incision. The position of the components can then be fixated. Also, the shape may be changed by rotating the matrices relative to each other, such as e.g. in a bifurcated stent to rotationally move the bifurcated ends with respect to each other. FIG. 9 shows, for example, an assembly 2 of which the first constructive element is attached to a first plate 9 and the second constructive element is attached to a second plate 10. The assembly thus forms a mechanical joint which allows the plates 9, 10 to move relative to each other. Thus, the plates can be positioned to contact respective surfaces and be attached to a respective surface. Although a large variety of attachments is possible, in this example each plate has a main body and slotted fingers projection away from the body at least partly in the same plane as the body. Through the slots e.g. a screw can be tapped into the surface. It will be apparent that although in this example the plates 9,10 are parallel and face each other, other orientations are also possible, such as oblique or perpendicular.

In addition to the variable shape, the porous parts allow tissue to grow in between the matrices. This allows, for example, the assembly to osseo-integrate or to have soft-tissue grow into the matrices. In other applications as well, e.g. when used in a submerged structure, such as in a riverbed or at the sea-bottom, sediment may be retained inside the porous part and e.g. the porous part may provide a surface for algae and invertebrates like shells to grow on.

Figure 2:
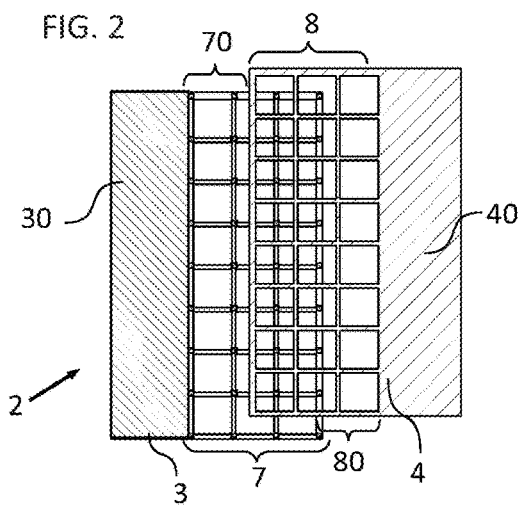
FIG. 2 schematically shows a cross-sectional side view of another example of an embodiment of a constructive assembly.

The constructive elements may be implemented in any manner suitable for the specific implementation. As illustrated in FIG. 2, at least one of the first and second constructive elements may comprise a solid part 30,40 attached to the overlapping part. As shown in FIG. 2, the solid part may for example be separated from the overlapping part 50,60 of the matrix 7,8 by a projecting part 70,80 of the matrix that projects out of the other matrix. The solid part may for example be part of a monolithic element which comprises the matrix as well. Such an element has a good mechanical strength.

Figure 3:
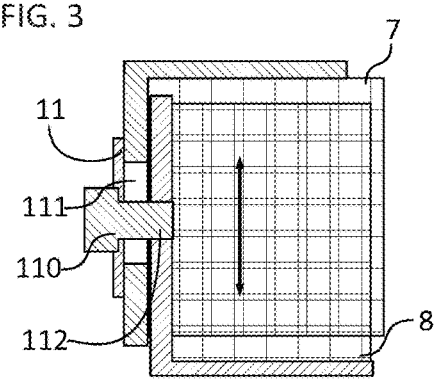
FIG. 3 schematically shows a cross-sectional side view of another example of an embodiment of a constructive assembly.

Referring to FIG. 3, the assembly or the implant can further comprise a fixation 11 for fixating a position and/or orientation of the first constructive element relative to the second constructive element. The fixation may be adjustable in-situ to adapt the shape of the implant to the subject in which the implant may be provided. In this example, the fixation is a basic one comprising a nut 110 which extends through a slot in the first constructive element and engages with a threaded hole 112 in the second constructive element. By tightening the nut, the constructive elements 3,4 are fixated in position. It will be apparent that more complex fixations are possible, and that a fixation may be permanent or be non-destructively releasable. Depending on the specific application, a movable attachment is likewise possible, e.g. when the implant needs to flex or otherwise adjust it shape during it's in-vivo use.

The form-closed connection may be any suitable type of form-closed connection. The form-closed connection may be a permanent one, i.e. meaning that it cannot be released without destructively deforming the shapes or a temporary one, i.e. which can be released by non-destructively deforming the shapes. In the shown example, the form-closed connection is between open cells of the first overlapping part and open cells of a second overlapping part of the second matrix through which the first overlapping part extends. Said differently, the first matrix comprises a number of connected open cells, each of which is form-closedly, but movably, connected to one or more open cells of the second matrix. More specific, in this example the connected open cells of the first matrix extend through the second matrix, and more specific through the open cells of the second matrix to which they are connected.

The form-closed connection between the connected open cells is in the examples established as follows. The first overlapping part 50 comprises first open cells 51 of which the edges 52 extend through open faces 63 of second open cells 61 of the second overlapping part 60, and which enclose the edges 62 of the second open cells. Vice versa, the second overlapping part 60 comprises second open cells 61 of which the edges 62 extend through open faces 53 of first open cells 51 of the first overlapping part 50, and which enclose the edges 52 of the first open cells 51. Free space is present between the edges of the first and second open cells 51, 61 such that the connected cells are movable relative to each other.

Depending on the specific application, the overlapping parts 50, 60 can be movable in one, two or three dimensions relative to each other. The parts can be movable translationally and/or rotationally. As a consequence, the constructive elements can have any degree of freedom (DoF) of movement relative to each other from 1 up to and including 6. In this respect, the freedom of movement is limited in principle by the connection. However, in case one or more, e.g. all matrices are deformable in one, two or three dimensions, e.g. elastically or plastically, the freedom extends beyond the limit of the connection.

Figure 4:
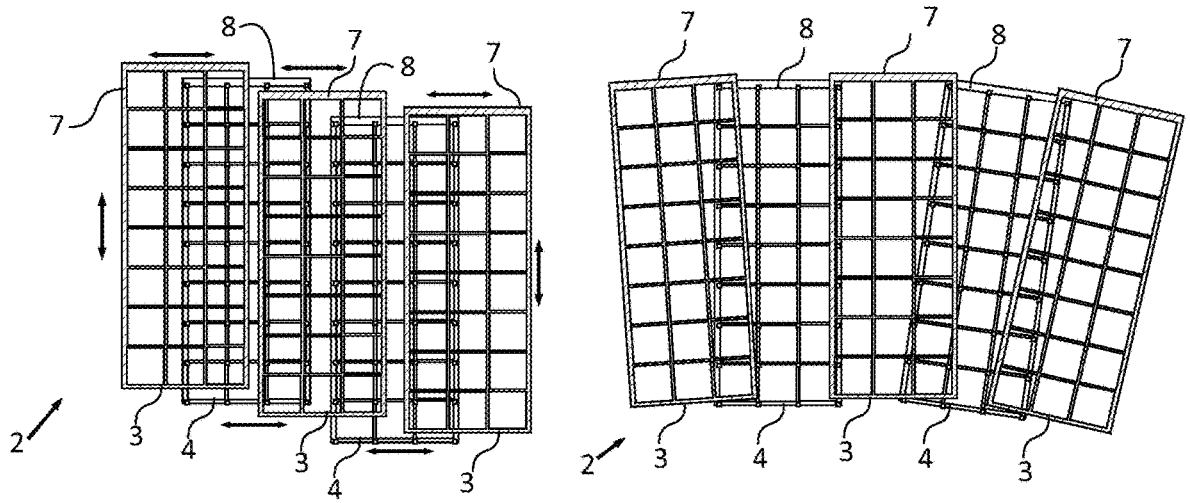
FIG. 4 schematically shows a cross-sectional side view of example of an embodiment of a constructive assembly in two different states.

Alternatively or additionally, one or more, e.g. all matrices may be, for practical purposes, rigid. When all matrices are rigid, the freedom of movement is limited to that provided by the form-closed connection. However, as illustrated in FIG. 4 a series of three or matrices may be connected, e.g. in a chain-like arrangement, such that the overall freedom of movement of the ends of the chain is the sum of the freedom of movement of the directly adjacent matrices. Such a movement may be translational, as in the left hand side, and/or rotational, as in the right hand side of FIG. 4.

Figure 6:
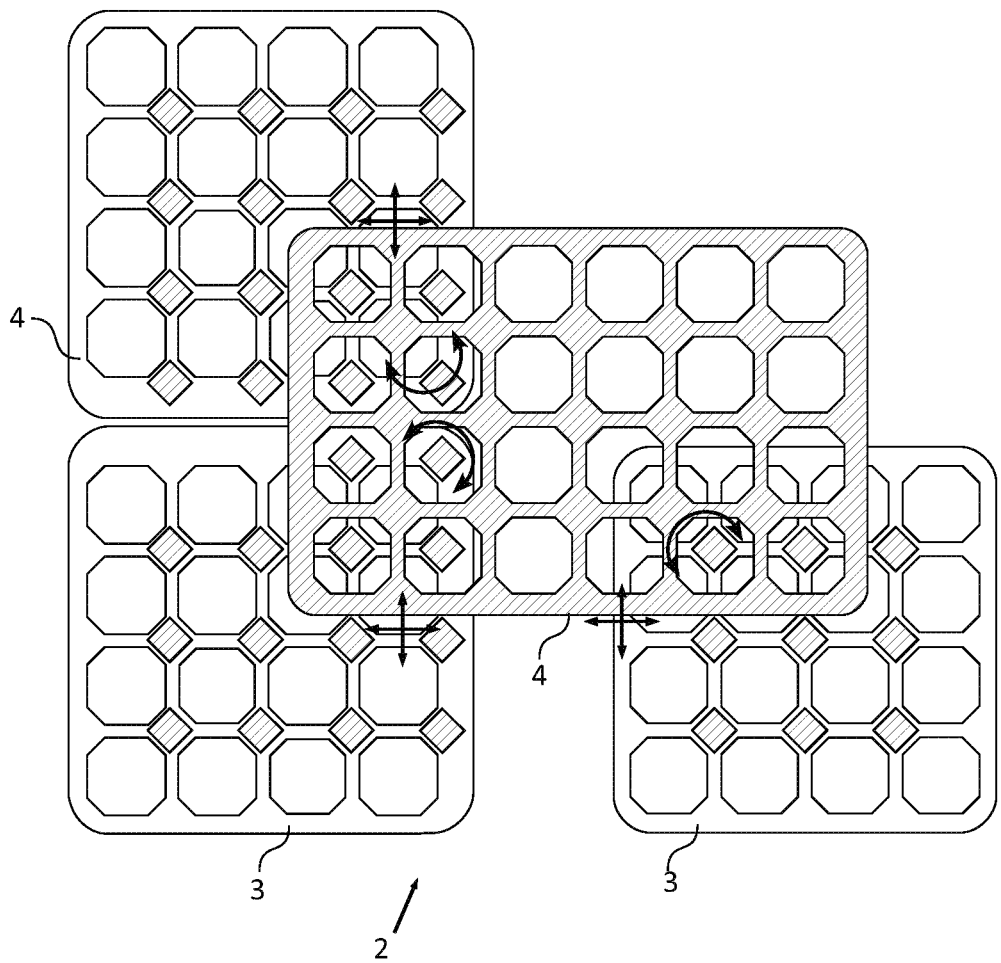
FIG. 6 schematically shows a cross-sectional top view of another example of an embodiment of an implant.

As illustrated in FIG. 6, other arrangements of three or more matrices are possible as well. In FIG. 6 for example, the constructive assembly 2 comprises a central matrix 4 which is connected to outer matrices 3 at different sides. The matrices 3,4 are translationally and/or rotationally movable as illustrated in FIG. 6 with the arrows. Thus, the outer matrices 3 have a freedom of movement relative to each other that is larger than the freedom of movement between an individual outer matrix and the central matrix.

The matrices and the constructive elements may be implemented in any manner suitable for the specific implementation. One, or more than one, and preferably each of the matrices can for example be a monolithic element, and may be made of a single piece of material. This provides a strong matrix capable of withstanding the forces occurring during implantation and post-implantation. Alternatively, one or more of the matrices may be made of multiple pieces attached to each other, e.g. in case the respect matrix is allowed to disintegrate during use.

The first matrix may for example be made of the same material(s) as the second matrix. This allows manufacturing of both matrices at the same time, e.g. using an additive manufacturing. Alternatively, the first matrix may be made from materials different from the second matrix. This allows, e.g. a rigid first matrix and a flexible second matrix. One, or more than one, or all of the matrices may be non-degradable in-vivo or in-situ. This allows a permanent structure where the movability provides e.g. a joint between mechanical links.

Alternatively or additionally, one, or more than one, or all of the matrices may be bio-degradable in-vivo. This allows e.g. to place a temporary implant, or an implant with temporary parts, without requiring surgery to remove the implant. Also, for instance, the bio-degradable degradable matrix may fill a gap between a non-degradable matrix and tissue to be regrown, such as bone. This allows e.g. placing an implant at a location in a space larger than the implant, expanding the implant such that the degradable matrix bridges the space between the non-degradable matrix and the edge of the gap. The degradable matrix can then disappear while the gap fills, e.g. by tissue regrowth.

In the shown examples, the first overlapping part 50 and the second overlapping part 60, and more in general the matrices, comprise a three dimensional arrangement of n by p by q open cells, with n,p and q being positive integers of at least 2. For example, (n and p) or (p and q) or (q and n) or (p,q and n) may have the same value or have a different value. Any of n,p, and q may be any value out of the group consisting of: 2,3,4 5, at least 10, at least 20, at least 50, at least 100, such as at least 200, at least 500 or at least 1000, depending on the specific implementation. The three dimensional arrangement of the first overlapping part extends through the three dimensional arrangement of the second part.

Figure 5:
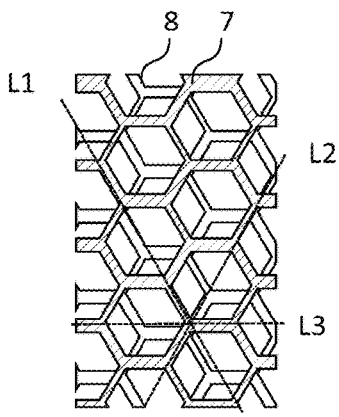
FIG. 5 schematically shows a cross-sectional side view of a detail of an example of an embodiment of a constructive assembly.

One, or more than one, of the matrices may be an arrangement of unit cells, of which the unit cells form a symmetric pattern that repeats along the principal directions of three-dimensional space. This arrangement then forms a lattice structure, which is built up by repetitive translation of the unit cell along its principal axes. As illustrated in the examples of FIGS. 1-8, one, more than one or all of the matrices can both formed by an arrangement of open unit cells and have a lattice structure defined by the open unit cells. In such case, the second matrix may be movable along lattice planes of the lattice structure of the first matrix as is illustrated in FIG. 5 with dotted lines L1-L3. Some or all of the matrices can have the same unit cells and lattice structure, or the matrices can mutually differ in unit cells and/or lattice structure. In the shown example, the lattices planes of the first matrix are parallel to the lattice planes of the second matrix. The lattice planes of the first matrix and the second matrix are interleaved, and the distance between parallel planes of the first matrix is larger than the thickness of the edges of the cells of the second matrix extending parallel to the lattice planes (and vice versa for the planes of the second matrix and the edges of the first matrix). Thus, there is play to move the matrices relative to each other.

Figure 7:
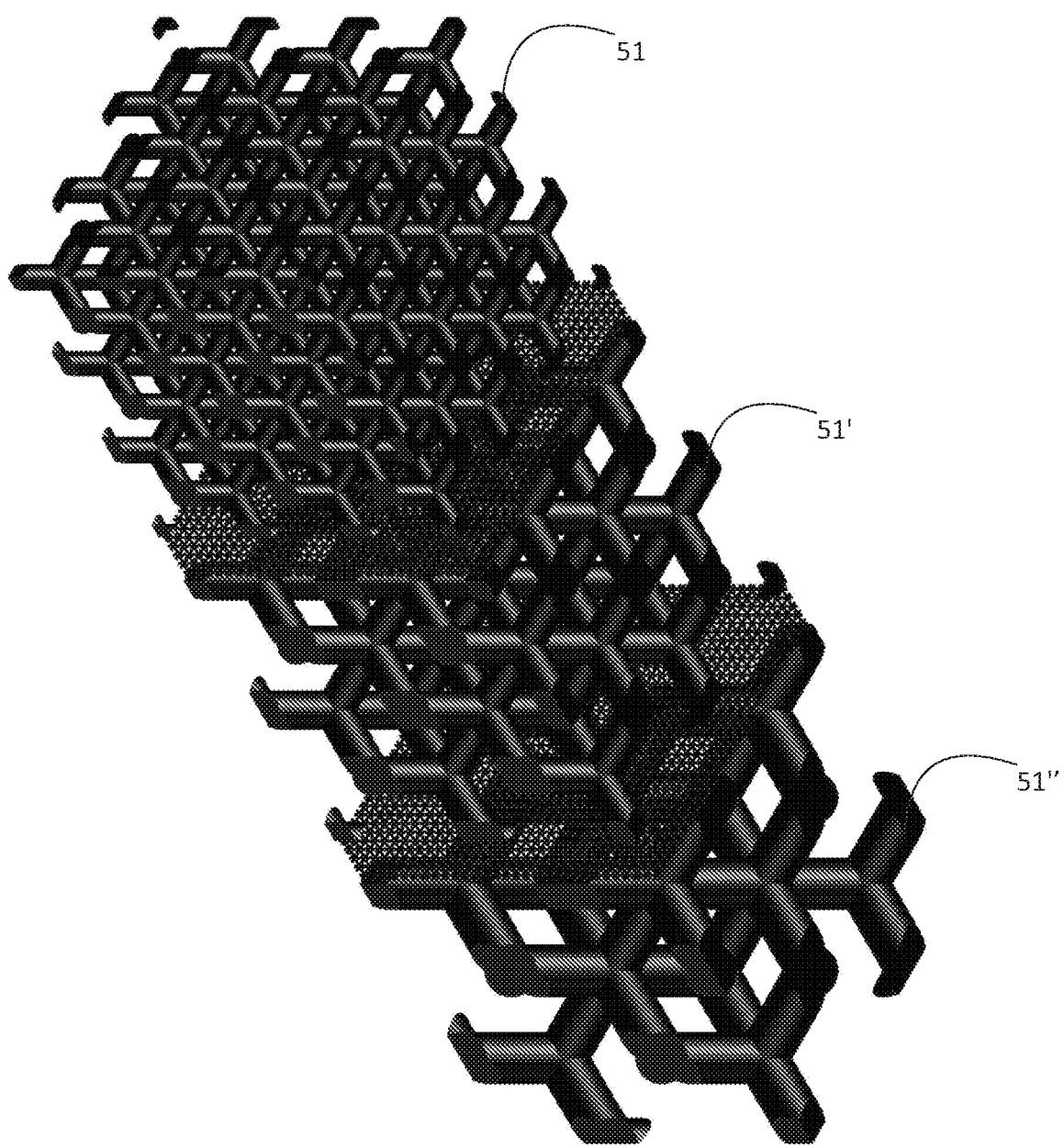
FIG. 7 schematically shows a perspective view of an example of an embodiment of a constructive element suitable for a constructive assembly.
Figure 8:
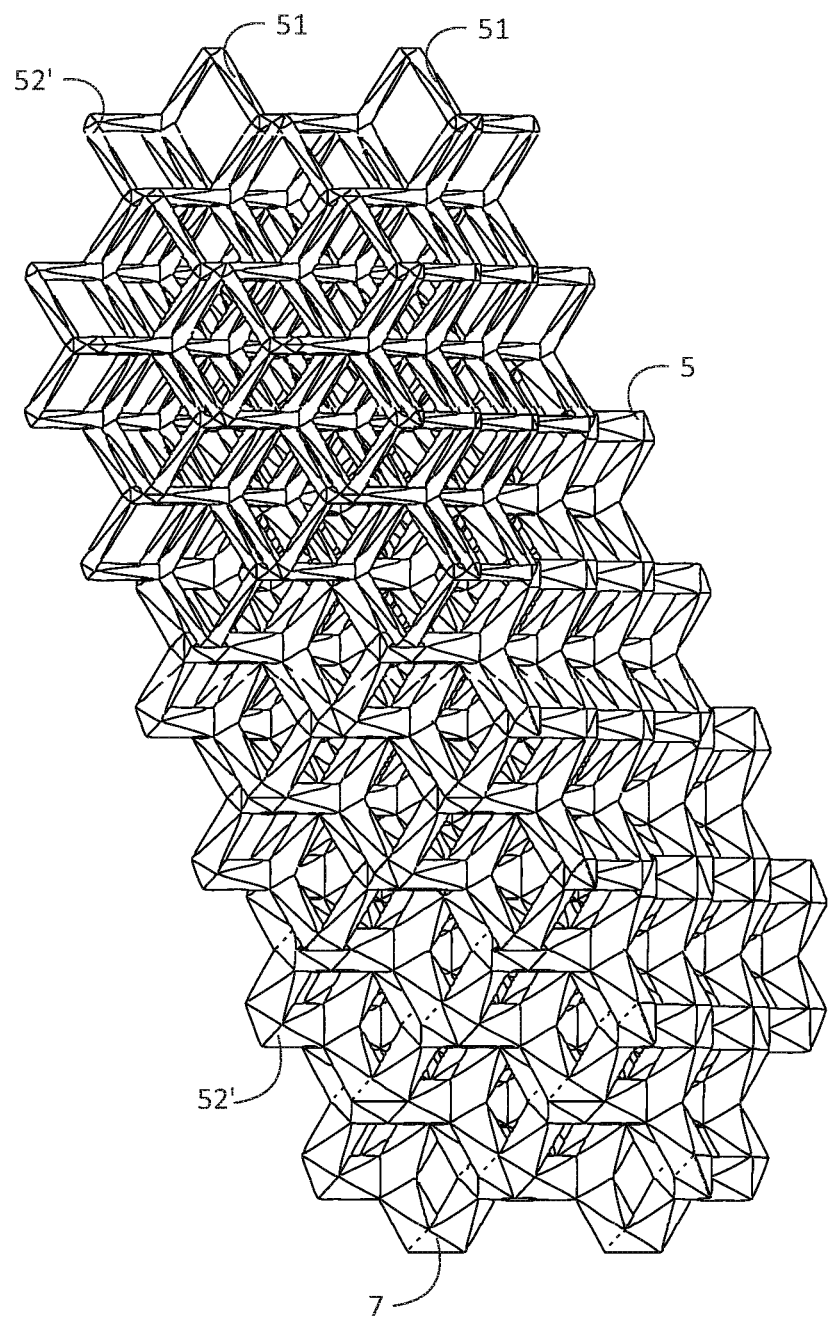
FIG. 8 schematically shows a perspective view of another example of an embodiment of a constructive element suitable for a constructive assembly.

One, or more than one, of the matrices may be formed of an arrangement of two, or more than two, species of unit cells. The species may differ in one, or more than one, of: type, cell size, porosity (also referred to as openness), regularity, homogeneity. FIG. 7 for instance shows an example of a matrix in which the size of the unit cell varies, and more specifically increases from one side to the other. Thus, the matrix comprises a first segment with smaller unit cells 51 and a second segment with mid-sized unit cells 51' larger than the smaller unit cells. The matrix further comprises a third segment with larger unit cells 51" which are larger than the mid-size unit cells 51'. As explained below in more detail, FIG. 8 shows an example of a matrix with varying porosity and with unit cells of varying openness.

Alternatively, or additionally, one, or more than one, or all of the matrices 7,8 may be formed of an arrangement of a single type of unit cells, as in the example of FIG. 1 for instance. The open cells, and more specific, the unit cells can have one or more geometrical shapes and for example be polyhedrons, such as convex polyhedrons. FIG. 14-18 show some examples of suitable shapes for the cells 51,61 in addition to the cuboid or cubic unit cell in FIG. 1, the shown examples are diamond unit cell 512, rhombic dodecahedron unit cell 513, truncated cubic unit cell 514, truncated octahedron 515 and rhombic octahedron unit cell 516. The unit cells may likewise be Triply Periodic Minimal Surfaces (TPMS) or Voronoi structures.

The average size of the open cells can be between 0.1 and 0.8 mm, such as e.g. between 0.05 mm and 1 mm, such as in the range of 0.25 mm to 0.75 mm. Depending on the specific implementation, the cells may have the same or varying sizes (e.g. when the sizes are distributed according to a Gaussian or a normal distribution). For example, at least 90% of the number cells can have a size between 0.1 and 0.8 mm.

The porous parts 5,6, of the constructive elements 3,4 can be of any suitable type and the first matrix 7 and the second matrix 8 can for example comprise or consist of open cell solid foams. The foam can for example be made of a, biocompatible, metal and be an open cell metal foam. Such a foam can for example be a self-forming structure and form a three dimensional network of cells. The open cell metal foam may for example be reticulate solid foam, as shown in the examples for instance. Also, the foam can be a regular foam or a stochastic foam. In the FIGURES for instance, the foam is a regular, reticulate foam. A matrix may comprise or consist of a single type of metal foam, but may likewise comprise or consist of a mixture of foams, such as a mixture of reticulated foam and partially or completely closed cells, like closed cell foam. For instance, the mixture may consist of 50% or more of reticulated foam and 50% or less of closed cells, and may for example have 90% or more of reticulate foam. As an example, the mixture may have 99% or more reticulated foam and 1% or less (but, of course, not 0%) of closed cells.

As illustrated in FIG. 8, the porosity of one, more than one, or all matrices 7,8 can vary in one or more directions, e.g. increase or decrease. The increase or decrease may be step-wise or gradual. The porosity may increase or decrease monotonically in a certain direction, as in in FIG. 8, but alternatively the porosity may fluctuate and (repeatedly) increase and decrease in the direction of variation. In FIG. 8, the porosity varies only in one direction (e.g. length) but it will be apparent that a variation may be applied in other manners (e.g. in two non-parallel directions or in three perpendicular directions), e.g. from the outside inwards e.g. towards a longitudinal axis. The matrix can for example have one or more, high porosity layers (or segments of n by p by q) cells which may be more porous (and/or a bigger (average) pore size and one or more low porosity layers (or segments of n by p by q) less porous and/or with a smaller pore size than the high porosity layer. This allows e.g. to have a relatively stiff but still porous low porosity part, while due to the high porosity, osseo-integration will be improved by the high porosity part. Accordingly, the stiffness of the constructive element can be modulated in one or more directions.

For example, the high porosity layer may have a porosity of at least, or equal to, one of the group consisting of: 70%, 80%, 90% and less than 100%, such as less than one of the group consisting of: 95%, 85%, 75%. The low porosity layer may have a porosity which (of course) may be more than 0%, such as at least at least 10%, such as at least 20%, such as at least 30%, such as at least 40%, for example at least 50%, such as at least 55%. The low porosity layer may have a porosity which may be a certain percentage less than the high porosity layer, which can for example be at least, or equal to, one of the group consisting of: 10%, 20%, 30%.

As shown, in these examples, the matrices have a porous inside and at least a part of their surface open or outer pores as well. In the example, the outer pores are provided over the complete surface and the matrices are open at all sides. The porous inside is in fluid communication with the outer pores, which allows bone ingrowth into the porous inside. For instance, the inner and outer pores may form an integral network of porous cells. The porous outer surface of the matrices may for example have an openness of at least 5%, for example at least 10%, and preferably at least 50%, such as at least 80%. The openness will of course be less than 100%, and may e.g. be 90% or less, for example less than 70%. The openness is defined as the ratio of the aggregate non-closed areas of the outer pores occupied at the outer surface and the total area of the outer surface.

The assembly may be part of any type of implant in which movement of the matrices is suitable. Such an implant can e.g. be sterilized and be provided in a sterile package. The implant can for instance be an implant selected from the group consisting of: permanent prosthesis, temporary prosthesis, orthopaedic implant, dental implant, spine cage, stent and combinations of two, or more than two, of such types. The implant can e.g. be for in-vivo implantation in one, or more than one, selected from the group consisting of: non-human animal, human, domestic animal, pets, and livestock.

Figure 10:
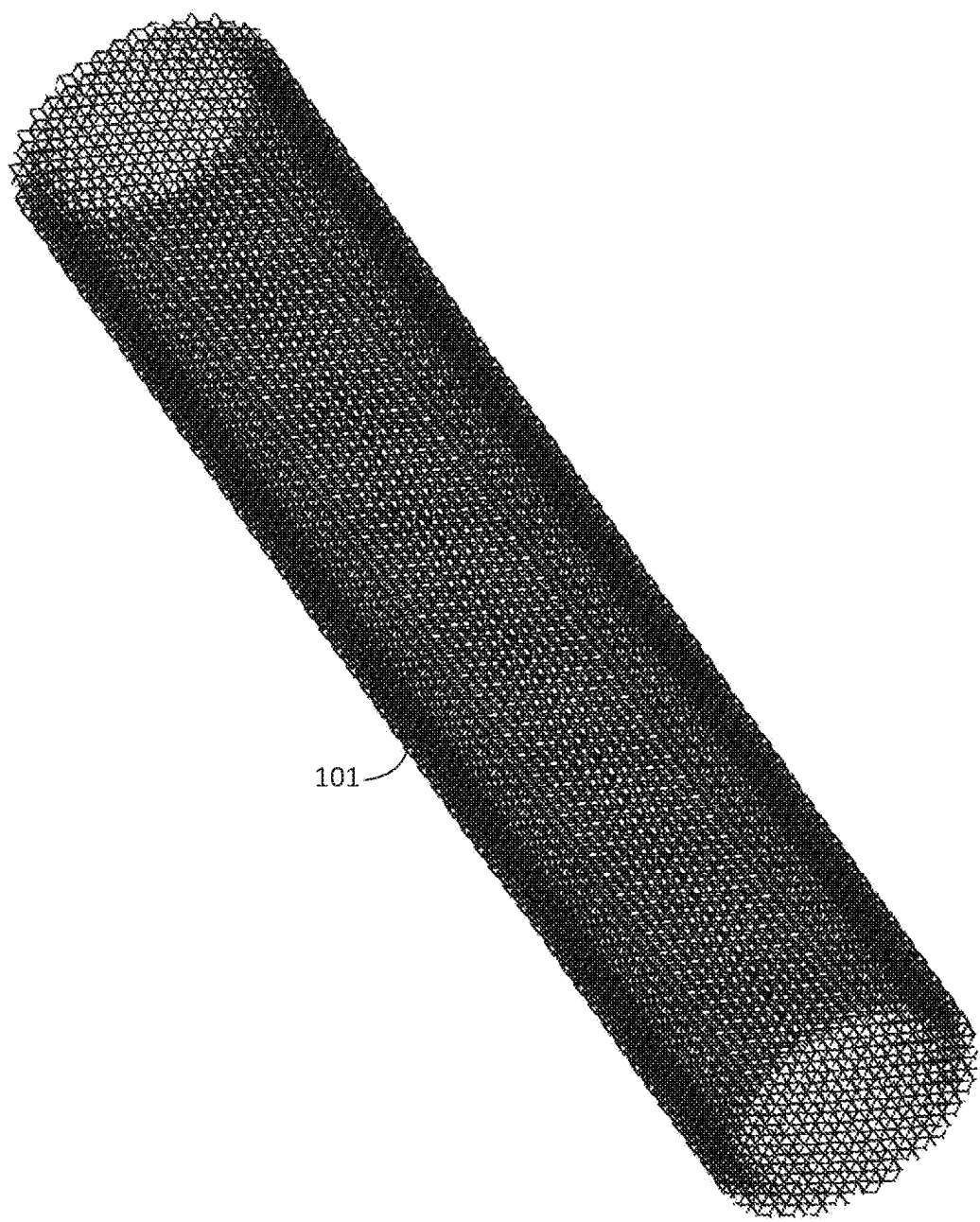
FIG. 10 schematically shows a perspective view of example of a constructive element suitable for a stent.
Figure 11:
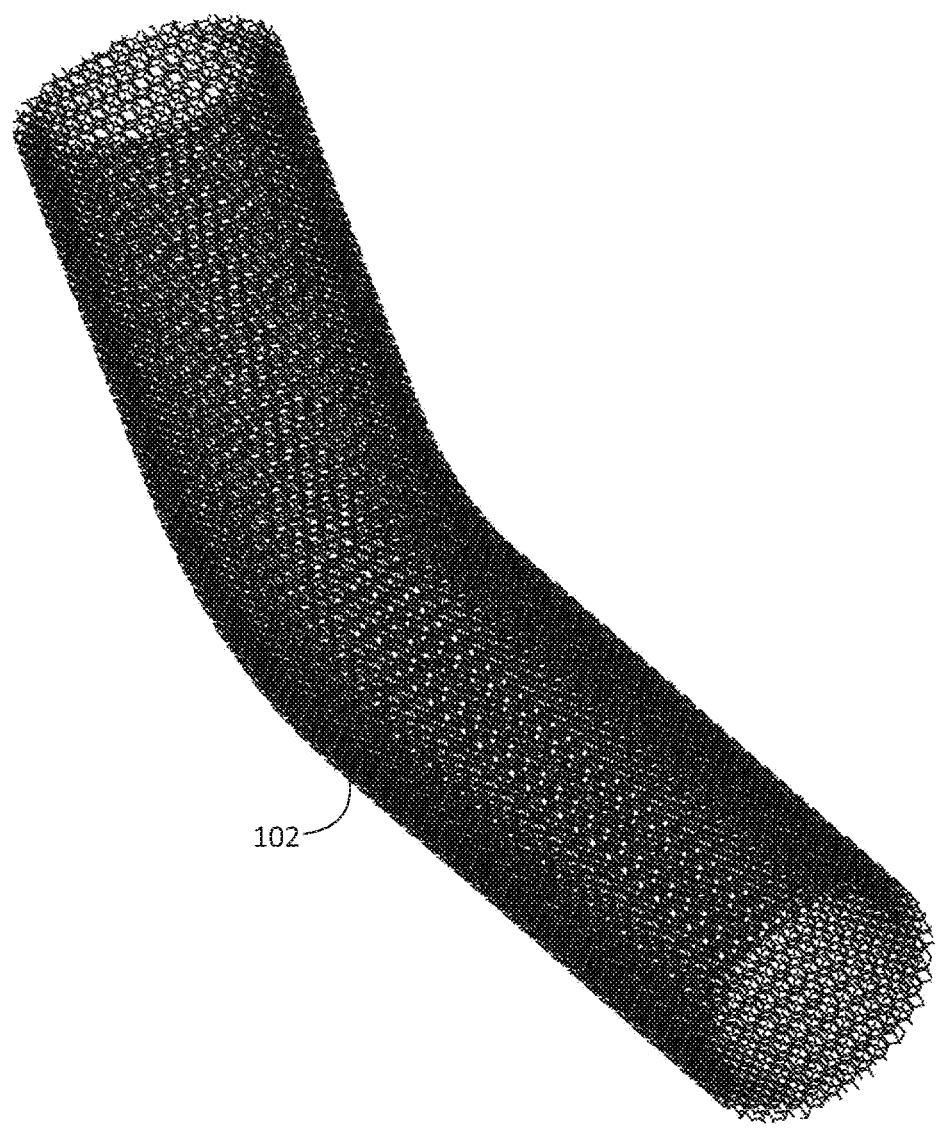
FIG. 11 schematically shows a perspective view of another example of a constructive element suitable for a stent.
Figure 12:
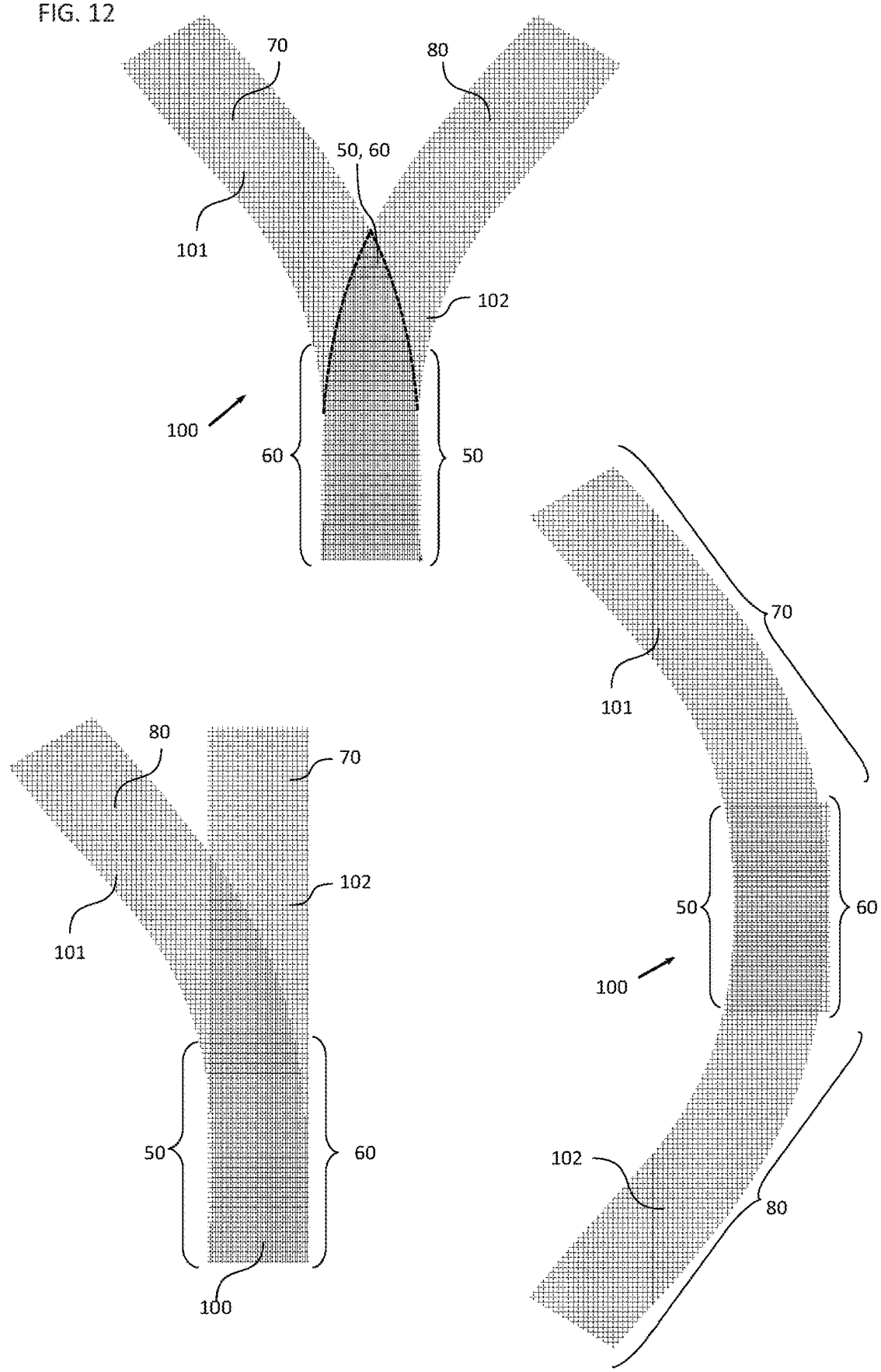
FIG. 12 schematically shows top views of examples of stents in which the elements of FIGS. 10 and 11 may be used.

FIGS. 10 and 11 show as an example parts 101,102 of a stent 100, and more specific of a bifurcated stent, such as for coronary bifurcations lesions. As shown, each part comprises a tube-formed matrix with a hollow inside and open ends. FIG. 10 shows a straight tube, whereas FIG. 10 shows a bend tube. As illustrated in FIG. 12, by connecting the parts 101,102 to have an overlapping part 50,60 where the matrixes have a form-closed connection, a stent may be obtained. More specific, at a respective connected end of the tube-shape, the parts 101,102 may be connected to each other. As illustrated at the top of FIG. 12, for example two parts may be connected to extend in the same direction away from the overlapping part to form a Y-shaped or a T-shaped stent. For example, two bend parts 102 may be connected in such a manner, as shown with the example at the upper side of FIG. 12. Alternatively, a bend part 102 and a straight part 101 may be connected in such a manner, as illustrated at the left-hand bottom side in FIG. 12. As illustrated at the right hand side in FIG. 12, the parts 101,102 may also be connected to extend in opposite directions away from the overlapping part 50,60. In such a case, e.g. a C-shaped stent may be obtained.

Due to the movable, form closed connection the free ends of the connected tube-shaped parts can move relative to each other. Thus, for example, the bifurcated free-ends can be moved towards or away from each other, or in case of the C-shaped stent the curvature be adapted.

Typical dimensions of the stent (although other sizes being possible as well depending on the vessel or duct in which the stent is to be placed) can be a length between 5 mm and 50 mm. For example, the length can be 8 mm or more, such as 15 mm or more. The length can be less than 40 mm, for example less than 30 mm, for instance. A suitable range for the length is a length between 8 and 38 mm. The diameter of a tube can e.g. between 2 and 10 mm. The minimum diameter can for example be 2.25 mm or more, such as 3 mm or more. The maximum diameter can for example be less than 8 mm, such as less than 5 mm, such as 4 mm or less.

Figure 19:
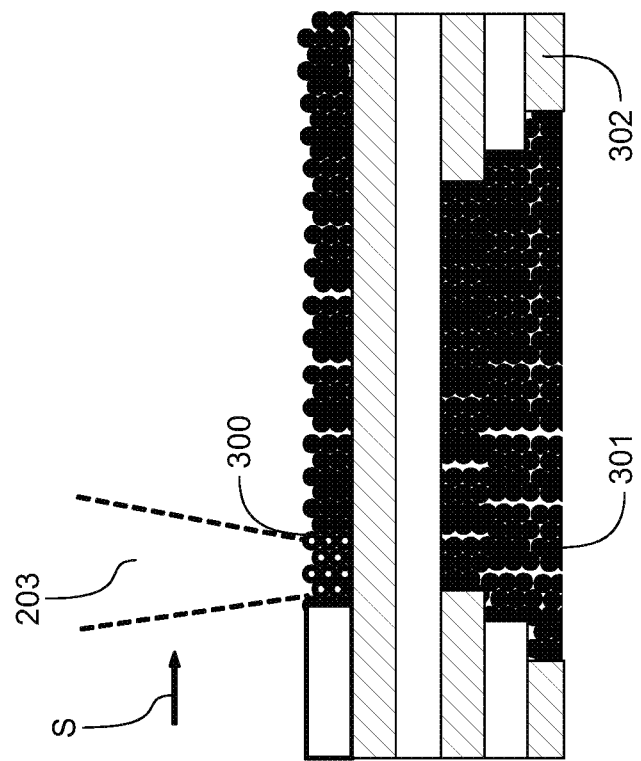
FIG. 19 schematically illustrates a manufacturing arrangement suitable to manufacture an implant or an assembly.
Figure 19:
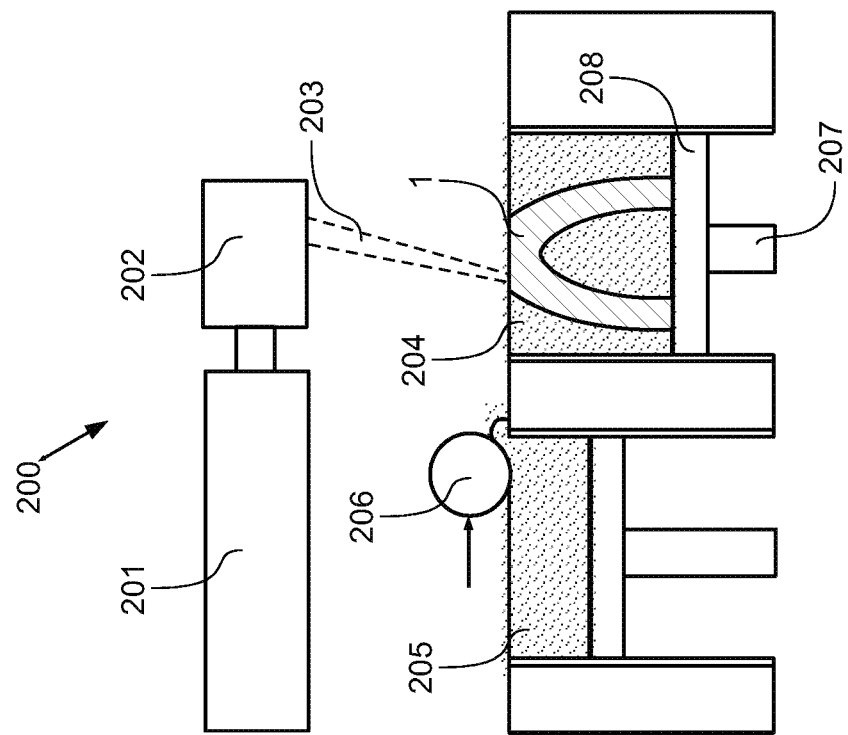

An implant or an assembly as described above, or as described further down in the parts with the title "claims" can for instance be manufactured by using an additive manufacturing technique, or with a hybrid technique of an additive manufacturing technique plus subtractive manufacturing. Such an intermediate product can be shaped by forming successive layers of material under computer control, for example by selective laser melting or SLM. FIG. 19 schematically shows a selective laser melting machine 200 suitable to be used to shape the intermediate product.

As shown, the SLM machine 200 comprises a laser 201 which produces a laser beam 203 which scans a powder bed 204 of a selectively meltable material, in this example via scanning optics 203. These direct the laser beam over the exposed top layer of the bed 204 under control of a computer, i.e. a programmable apparatus controlling the optics 203, in accordance with a computer program which uses data representing a model of the dental implant as input.

As more clearly seen in the right hand side of FIG. 19, the laser selectively melts the powder of the top layer in melting areas 300. After sintering the top layer in those areas, a new top layer may be applied. In this example, the powder bed 204 may be lowered, by moving the plate 208 on which the building plate the object, i.e. in this example the intermediate product, rests downwards by means of piston 207. The new top layer may be applied by moving a pile of powder upwards by means of a delivery piston 205 and displacing powder projecting above an edge of the delivery system with a roller 206 to cover the top surface. As shown in FIG. 12, this successive applying of a layer of powder and locally sintering the powder results in a stack of patterned layers of sintered material which shape the object.

Upon sintering of the final layer, the object can be taken from the plate 208 and the un-sintered material removed. The intermediate product may then be subjected to post-processing, such as a heat treatment for stress relieving and tempering.

It has been found that a SLM process allows to manufacture the complex structures in a manner that requires little post processing. In particular, this allows to manufacture the constructive elements as monolithic elements (or at least the matrices 7,8) which are form-closed and movable relative to each other immediately, without e.g. further etching or removal of material being required to release the matrices from each other. It is further believed that in case of application in an implant, the surface roughness of the product is ideal for bone on-growth and hence the intermediate product is already suitable for use a final product, without further surface treatment being required. However, it will be apparent that further steps to e.g. attach other parts of the implant to the assembly or to sterilize the product may be applied before the product is shipped.

As another example, the manufacturing arrangement may be a casting arrangement and the manufacturing process may comprise casting the matrices 7,8. In such a case, a part of the first constructive element comprising the first overlapping part, or the entire first constructive element, can be casted in a mould provided with a first pattern of solids and voids corresponding to the first matrix. (It will be apparent that the voids may before casting be filled with a material that during casting e.g. melts, evaporates or otherwise disappears.) This first casting can comprise filling the voids with a material of the first matrix. As a result, the pattern will comprise the first pattern but with the voids filled with the first matrix material and the solids. A part of the solids of the first pattern may then be dissolved (i.e. in a suitable solved or melted and drained as with wax) to obtain a second pattern of solids and voids corresponding to the second matrix. For instance, the solids corresponding to the second pattern may be of a different composition than the other solids, e.g. with a lower melting point and thus be removed by heating while retaining the other solids. Preferably, this treatment is one to which the material of the first matrix resists, e.g. by using a solvent in which that material is insoluble or by melting the solids below a melting temperature of the material. The second overlapping part may then be casted, which can comprise filling the voids of the second pattern with a material of the second matrix. The solids of the second pattern may then be dissolved (i.e. in a suitable solvent or melted and drained as with wax) to obtain the first and second matrix with the form-closed connection.

The manufacturing process may use data representing a model of the implant or assembly. In such a case the data may be loaded into a data processing device, e.g. an embedded control system or other type computer performing the computer control, and the data processing device operated to control the forming by the manufacturing apparatus to obtain a shape in accordance with the data. The model can be obtained in any manner suitable for the specific implementation. The design may be stored on a, tangible, data carrier as data loadable in a computer representing a model of the implant or assembly is stored.

The data representing the implant can for example be obtained by first generating a first model of the first constructive element on a data processing apparatus, such as a computer on which computer aided design software may be run. Likewise, a second model of the second constructive element may be generated on a data processing apparatus, which may be the same or a different apparatus. The implant or assembly data may then be generated with the first model and the second model extending through each at the areas corresponding to the overlapping parts of the constructive elements. This data may then be transmitted to the manufacturing arrangement.

The model may for example be designed by using a suitable computer aided design computer program, such as SolidWorks or CATIA etc., to make an initial solid model of the first constructive element, and a solid model of the second constructive element. These models may then be provided with pores by adding three-dimensional structures thereto, e.g. using software such as Autodesk Within medical, Materialise Magics or Autodesk Netfabb studio etc. a. This 3D structure can be made by using open unit cells as explained earlier, such as the cuboid, diamond, rhombic dodecahedron, truncated octahedron, etc., cells.

The two models can then be merged together to form the overall model. The monolithic model is subsequently converted into a format which is appropriate for 3D printing like the STL format.

Figure 20:
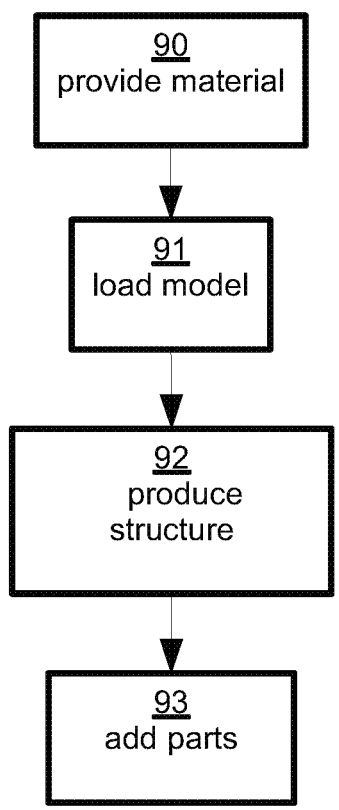
FIG. 20 shows a flow-chart of a method of manufacturing a dental implant in which the example of FIG. 19 may be used.

Referring to FIG. 20, as illustrated with the blocks in the flow-chart, the examples of assemblies and implants shown may be manufactured as illustrated therein, by providing (block 90) a biocompatible material and shaping (blocks 91-93) the biocompatible material to obtain a product or intermediate product. The biocompatible material can be shaped in a variety of manners, such as metal casting into a mould and locally injecting a gas to obtain a self-organizing porous structure.

An implant or assembly as described above and/or the part after the heading "claims" can be manufactured as illustrated with the flow chart of FIG. 20. As illustrated with block 90 "provide material", initially a material may be provided at a manufacturing arrangement. This material may e.g., be pre-shaped such as a block of metal or stone, or be unshaped such as a powder.

As illustrated with block 91 "load model", at the manufacturing arrangement data representing the implant or assembly to be manufactured may be received.

As illustrated with block 92 "product structure" the implant or assembly may then be manufactured in accordance with the data from the material. This may be the final product or be an intermediate product. E.g. in case of an implant, the product may at least be sterilized, and sterile packaged, after manufacturing but other additional processing may be possible as well. In case of an assembly, for example, other parts of the final product, such as mounting parts may be added to the structure. These parts may be permanently attached or be releasable, and be movable or immovable relative to the constructive assembly. Suitable manners of a permanent, immovable attachment may e.g. be welding, gluing or soldering.

In the foregoing specification, the invention has been described with reference to specific examples of embodiments of the invention. It will, however, be evident that various modifications and changes may be made therein without departing from the broader scope of the invention as set forth in the appended claims.

For instance, the matrixes of the overlapping parts, and more generally the implant may be made of any suitable biocompatible material. The material may for example contain a material out of the group consisting of: metals, metal compounds, metal alloys, metal composites, polymers, ceramics and combinations of materials of this group. The biocompatible material can contain a metal out of the group consisting of: titanium, tantalum, niobium, stainless steel, cobalt chrome alloys, zirconia, or a compound, alloy or composite thereof. Other suitable biocompatible materials can contain a polymer out of the group consisting of polyaryletherketone, polyether ether ketone, polyetherketoneketone.

Likewise, where a movement of an object is described (e.g. relative to another object) it will be apparent that, unless explicitly specified otherwise, this is a relative movement, and accordingly depending on the chosen reference frame, the object may be moving relative to an observer while the other object is static, the other object may be moving while the object is static relative to the observer or both objects may be moving, but differently, relative to the observer.

Also, where in the specific the term "data carrier" is used, this can for example be a tangible, non-transitory computer readable storage medium or be a computer readable transmission medium. These computer readable media can be permanently, removably or remotely coupled to the computer. The computer readable transmission medium may be a data transmission media such as wired or wireless transmission media, just to name a few.

The computer readable storage medium may comprise e.g., for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

Furthermore, in the examples the matrices are open at all sides. However, it will be apparent that in some applications, one or more or all of the matrices may have one or more closed outer surfaces and that e.g. some sides may be closed without any pores.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as "one or more than one". Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

LIST OF REFERENCE NUMBERS 1 implant
2 constructive assembly
3,4 constructive element
5,6 porous part
7,8 matrix
9,10 plate
11 fixation
30,40 solid part
50,60 overlapping part
51,61 open cells
52,62 cell edge
53,63 open face
70,80 projecting part
90 block
91 block
92 block
93 block
100 stent
101 stent part
102 stent part
110 nut
111 slot
112 treaded hole
200 SLM machine
201 laser
202 laser beam
203 scanning optics
204 powder bed
205 delivery piston
206 roller
207 piston
208 plate
300 melting areas
511-516 unit cell types

The invention claimed is:

1. An implant for in-vivo implantation; in a human or non-human animal, the implant being adjustable in shape during or after implantation, the implant comprising:
an assembly of at least a first constructive element nd a second constructive element, each constructive element comprising a monolithic porous part, the monolithic porous part of the first constructive element comprising a first three-dimensional matrix and the monolithic porous part of the second constructive element comprising a second three-dimensional matrix, wherein each of the first and second three-dimensional matrices comprising a three-dimensional network of open cell pores, wherein each network has a size of at least 2 open cell pores in a first dimension, at least 2 open cell pores in a second dimension and at least 2 open cell pores in a third dimension;
a mechanical joint between the first constructive element and the second constructive element, the mechanical joint configured to link the first constructive element and the second constructive element and configured to allow a movement of the first constructive element relative to the second constructive element during or after said implantation, the mechanical joint comprising:
a first overlapping part of the first three-dimensional matrix, the first overlapping part extending through the second three-dimensional matrix, a second overlapping part of the second three-dimensional matrix, the second overlapping part extending through the first overlapping part, and a form-closed connection between the first overlapping part and the second overlapping part, the first overlapping part being movable relative to the second overlapping part to move the first constructive element relative to the second constructive element and the second overlapping part being movable relative to the first overlapping part to move the second constructive element relative to the first constructive element;
the implant further comprising an adjustable exterior shape at least partially defined by a combined shape of the first constructive element and the second constructive element, which the adjustable exterior shape is adjustable during or after implantation by said movement of the first constructive element relative to the second constructive element.

2. The implant of claim 1, wherein the first overlapping part comprises first open cell pores and, the second overlapping part comprises second open cell pores, the first open cell pores having edges extending through open faces of the second open cell pores and enclosing edges of the second open cell pores.

3. The implant of claim 1, wherein the first overlapping part and the second overlapping part are movable in one, two or three dimensions relative to each other.

4. The implant of claim 1, wherein the first three-dimensional matrix further comprises a projecting part which is movable to project to a larger or smaller extent out of the second three-dimensional matrix, the overlapping parts are movable to bring the assembly from a first state to a second state, and the projecting part is configured to project to a lesser extent out of the second matrix in the first state than in the second state.

5. The implant of claim 4, wherein in the second state the projecting part is rotationally and/or translationally moved, relative to a position of the projecting part in the first state, in a direction away from the second three-dimensional matrix.

6. The implant of claim 1, wherein at least one of the first and second constructive elements further comprises a solid part attached to the overlapping porous part of the first or second constructive elements.

7. The implant of claim 1, wherein:
the first three-dimensional matrix and the second three-dimensional matrix have a lattice structure defined by an arrangement of open unit cells; and
the second three-dimensional matrix is movable along lattice planes of the lattice structure of the first three-dimensional matrix.

8. The implant of claim 7, wherein the first three-dimensional matrix and the second three-dimensional matrix have different unit cells and/or a different lattice structure.

9. The implant of claim 1, wherein at least one of the first three-dimensional matrix or the second three-dimensional matrix is formed of an arrangement of at least two species of unit cells, said species differing in at least one of: type, cell size, porosity, regularity, homogeneity.

10. The implant of claim 1, wherein the joint is a lockable joint and the joint further comprises a fixation selectively engageable on the first constructive element and the second constructive element for locking the first constructive element in a position and/or orientation relative to the second constructive element during or after implantation.

11. The implant of claim 10, wherein the fixation is adjustable in-situ to adapt the shape of the implant to the a human or non-human animal in which the implant is provided.

12. The implant of claim 1, wherein at least one of the first constructive element and the second constructive element is a monolithic structure.

13. The implant of claim 1, wherein the implant is a type of implant selected from the group consisting of: permanent prosthesis, temporary prosthesis, orthopaedic implant, dental implant, spine cage, stent and combinations of at least two of said types.

14. The implant of claim 1, for in-vivo implantation in at least one selected from the group consisting of: non-human animal, human, domestic animal, pets, livestock.

15. The implant of claim 1, wherein the implant is a musculoskeletal joint prosthesis and the implant comprises a first attachment for attaching the first constructive element to a first bone and a second attachment for attaching the second constructive element to a second bone, and wherein the joint is configured to retain a movable connection between the first bone and the second bone after implantation.

16. The implant of claim 1, wherein the porous part comprises an open cell metal foam.

\* \* \* \* \*